United States Patent
Wu et al.

(10) Patent No.: US 12,546,603 B2
(45) Date of Patent: Feb. 10, 2026

(54) OPTICAL GYROSCOPE WITH BROADBAND COMB INTERROGATION

(71) Applicant: Honeywell International Inc., Charlotte, NC (US)

(72) Inventors: Jianfeng Wu, Tucson, AZ (US); Steven Tin, Edina, MN (US); Tiequn Qiu, Glendale, AZ (US); Matthew Wade Puckett, Phoenix, AZ (US); Glen A. Sanders, Scottsdale, AZ (US); Chad Hoyt, Roseville, MN (US)

(73) Assignee: Honeywell International Inc., Charlotte, NC (US)

( * ) Notice: Subject to any disclaimer, the term of this patent is extended or adjusted under 35 U.S.C. 154(b) by 384 days.

(21) Appl. No.: 18/356,768

(22) Filed: Jul. 21, 2023

(65) Prior Publication Data

US 2025/0027772 A1    Jan. 23, 2025

(51) Int. Cl.
*G01C 19/72* (2006.01)

(52) U.S. Cl.
CPC ................... *G01C 19/721* (2013.01)

(58) Field of Classification Search
CPC ..... G01C 19/721; G01C 19/727; G01C 19/72
See application file for complete search history.

(56) References Cited

U.S. PATENT DOCUMENTS 10,317,212 B1 * 6/2019 Diels ................. G01C 19/662
2016/0204571 A1   7/2016 Wu et al.

FOREIGN PATENT DOCUMENTS

| EP | 2650644 A2 | 10/2013 |
| EP | 2770298 A2 | 8/2014 |
| EP | 2741050 B1 | 5/2016 |
| EP | 3048420 A1 | 7/2016 |
| WO | 2021124790 A1 | 6/2021 |

OTHER PUBLICATIONS

Feng et al., "Progress of Waveguide Ring Resonators Used in Micro-Optical Gyroscopes", Photonics, 2020, Oct. 26, 2020, vol. 7, No. 96, pp. 1 through 16.
Liu et al., "Closed-loop Resonant Fiber-Optic Gyroscope based on a broadband source", 2022 20th International Conference on Optical Communications and Networks (ICON), as downloaded Mar. 10, 2023 from IEEE Xplore, pp. 1 through 3.
Liu et al., "Performance of a resonant fiber-optic gyroscope based on a Broadband source", Applied Optics, vol. 61, No. 16, Jun. 1, 2022, pp. 4971 through 4979.
European Patent Office, "Extended European Search Report", dated Feb. 10, 2025, from Ep Application No. 24184663, from Foreign Counterpart to U.S. Appl. No. 18/356,768, pp. 1 through 9, Published: EP.

* cited by examiner

Primary Examiner — Hwa Andrew Lee
(74) Attorney, Agent, or Firm — Fogg & Powers LLC (57) ABSTRACT

Embodiments utilize an optical frequency comb generator coupled to an optical resonator of an optical gyroscope. The optical frequency comb generator generates an optical frequency comb having frequency peaks that each correspond to a respective resonance frequency of the optical resonator. A control servo can be coupled to the optical frequency comb generator and controls the optical frequency comb output from the optical frequency comb generator. In doing so, the optical frequency comb remains tuned to the resonance frequencies of the optical resonator during gyroscope operation.

16 Claims, 5 Drawing Sheets

OPTICAL GYROSCOPE WITH BROADBAND COMB INTERROGATION

BACKGROUND

Resonator fiber optic gyroscopes (RFOGs) typically utilize narrow linewidth laser sources to generate the optical signals necessary for determining rotation rate measurements. An RFOG generally operates by propagating the optical signals generated by the laser through an optical resonator in counter-propagating directions. The lasers directed into the optical resonator are frequency-shifted to track the resonances of the resonator which are frequency-shifted due to the Sagnac effect when the RFOG experiences a rotation about its sense axis; this frequency-shift between the two output signals from the resonator can then be used to determine the rate of rotation experienced by the RFOG.

However, signals generated by narrow linewidth lasers are more susceptible to the optical Kerr effect, which is a nonlinear optical phenomenon that modifies the refractive index of the waveguide as a function of the intensity of the optical signal. A broadband light source (that is, a broad linewidth source that generates optical signals having a broadband frequency range) may reduce the optical Kerr effects present in the RFOG, but also introduces an additional problem: the broadband nature of the light source and the narrow resonance peaks of the optical resonator may cause the output intensity of the optical signals to substantially decrease after propagating through the optical resonator. As a result, the output signals may be too weak for the detection and processing circuitry to determine the rotation rate.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one example, an optical gyroscope is disclosed. The optical gyroscope comprises an optical resonator and an optical frequency comb generator coupled to the optical resonator. The optical frequency comb generator is configured to generate an optical frequency comb. The optical frequency comb is locked to at least one of a plurality of resonance frequencies of the optical resonator. The optical resonator is configured to receive an optical signal from the optical frequency comb. The optical signal propagates in the optical resonator in a first direction. The optical gyroscope comprises a reflecting element coupled to the optical resonator. The reflecting element is configured to reflect the optical signal after propagating in the first direction. The optical resonator is configured to receive the reflected optical signal. The reflected optical signal propagates in the optical resonator in a second direction opposite to the first direction. The optical gyroscope comprises at least one processor coupled to the optical resonator. The at least one processor is configured to determine an intensity corresponding to the reflected optical signal after propagating in the second direction. The at least one processor is configured to determine a rotation rate based on the intensity corresponding to the reflected optical signal.

In another example, a method for operating an optical gyroscope is disclosed. The method comprises generating, from an optical frequency comb generator, an optical frequency comb. The optical frequency comb is locked to at least one of a plurality of resonance frequencies of an optical resonator of the optical gyroscope. The method comprises coupling an optical signal from the optical frequency comb into the optical resonator. The optical signal propagates in the optical resonator in a first direction. The method comprises reflecting the optical signal after propagating in the optical resonator in the first direction. The method comprises coupling the reflected optical signal into the optical resonator. The reflected optical signal propagates in the optical resonator in a second direction opposite to the first direction. The method comprises determining a change in intensity from the optical signal and the reflected optical signal. The method comprises determining a rotation rate based on the change in intensity.

In yet another example, a program product is disclosed. The program product comprises a non-transitory processor-readable medium on which program instructions configured to be executed by at least one processor are embodied. By executing the program instructions, the at least one processor is configured to receive a signal corresponding to an optical signal after propagating in an optical resonator of an optical gyroscope in a first direction. The at least one processor is configured to determine an intensity corresponding to the signal. The at least one processor is configured to determine a repetition rate of an optical frequency comb based on the intensity corresponding to the signal. The at least one processor is configured to send at least one control signal to an optical frequency comb generator. The at least one control signal is configured to modulate an optical frequency comb generated by the optical frequency comb generator with the repetition rate.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as briefly described below and as described further in the detailed description.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 1:
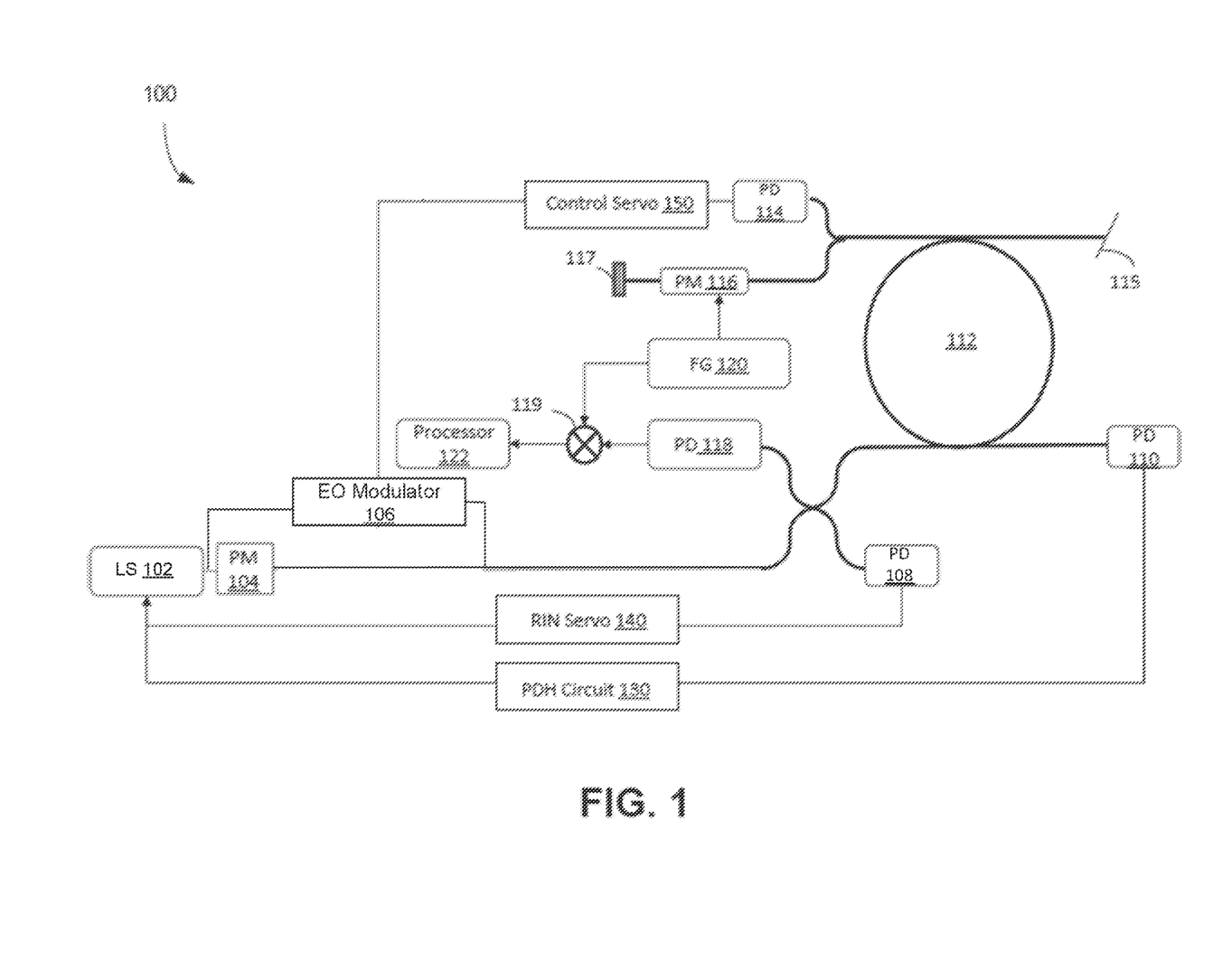
FIG. 1 depicts a block diagram of an exemplary optical gyroscope, as described in one or more embodiments.

FIG. 1 depicts a block diagram of an exemplary optical gyroscope 100 used to implement the advantages of the present disclosure. The optical gyroscope 100 in the embodiment shown in FIG. 1 is implemented as a resonator fiber optic gyroscope (RFOG), in which a fiber optic resonator 112 is used to resonate optical signals that propagate in the optical gyroscope. Other optical ring resonators can be used as sensing resonators. The components of optical gyroscope 100 can be optically coupled through suitable guided optics, such as waveguides, mirrors, beam splitters, and the like. The components of optical gyroscope 100 are generally connected by optical waveguides for pedagogical explanation, but free-space optics may also be used where applicable.

In the embodiment of FIG. 1, optical gyroscope includes a broadband light source 102 coupled to an electro-optic modulator 106. In some embodiments, such as the embodiment shown in FIG. 1, the laser source 102 is split into two waveguides. One is coupled to a phase modulator 104 that is used for Pound-Drever-Hall (PDH) modulation. The other is coupled into electro-optic modulator 106 that used to generate optical frequency comb, Laser source 102 is configured to generate low phase noise laser output.

Electro-optic modulator 106 acts as an optical comb generator and is configured to generate an optical frequency comb from the laser signals. While characteristics of broadband signals are generally known to one of ordinary skill, as an example, the broadband frequency range of the optical signals can encompass multiple resonance frequency peaks that correspond to the resonance modes of the optical resonator 112 (see FIG. 2A). In some embodiments, the functions of phase modulator 104 and electro-optic modulator 106 are performed by an integrated modulator unit. Phase modulator 104 is configured to modulate the phase of the laser signals in conjunction with Pound-Drever-Hall circuit 130, as subsequently described. Electro-optic modulator 106 then uses an applied electric field to generate sidebands of different frequencies, where each signal has an intensity peak at a distinct frequency. In this way, electro-optic modulator 106 generates an optical frequency comb from a broadband source, with each signal representing a "tooth" in the comb.

A portion of the optical signals comprising the optical frequency comb are provided to a detector 108 (e.g., a photodiode). Detector 108 is configured to convert the optical signals to a corresponding electrical signal based on the intensity of the optical signal and provides the electrical signal to a relative intensity noise (RIN) servo 140. RIN servo 140 comprises circuitry configured for adjusting the intensity levels of the optical frequency comb generated by modulator 106. For example, RIN servo 140 generates a feedback signal to laser source 102 that adjusts the intensity of the broadband optical signals output from laser source 102. When the intensity is higher or lower than a setting value, RIN servo 140 controls the output of laser source 102 to compensate for changes to the output intensity as detected from detector 108 so that the output intensity stays at a constant level. In doing so, RIN servo 140 acts as a feedback servo to regulate the intensity of the optical signals.

The portion of the optical signals not provided to the detector 108 propagates to optical resonator 112 and are coupled into the optical resonator through suitable couplers (not explicitly shown in FIG. 1). When the optical signals enter the optical resonator 112, they propagate in a first direction around the resonator coil. In the embodiment shown in FIG. 1, the optical signals propagate in the counterclockwise (CCW) direction multiple times through the optical resonator 112. The optical resonator 112 is configured to pass optical signals at the frequencies of the resonance frequency modes of the resonator. Generally, the optical resonator 112 acts as an optical filter that passes the light that overlaps with the resonance peaks and rejects the light does not overlap with the resonance peaks. The frequency components of the optical signal waves from the laser that match the resonance frequency modes of the optical resonator 112 will resonate within the resonator and get transmitted through the resonator. In contrast, frequency components of the optical signals that do not match the resonance frequency modes of the optical resonator 112 get reflected at the input coupler. Some broadband sources such as Amplified Spontaneous Emission (ASE) sources have a broad range of frequency components, most of which do not correspond to resonance modes of the resonator 112 and thus will get reflected and then lost. Although optical signals generated by narrow linewidth lasers can be tuned to match the resonance frequencies of the optical resonator 112, such signals are more susceptible to the optical Kerr effect, thereby resulting in rotation rate errors known as bias instability.

In some embodiments, optical resonator 112 is configured as a 'zero-dispersion' cavity; that is, a resonator that compensates for material dispersive effects. For example, the waveguide dispersive effects of the optical resonator 112 can be tuned by its core-cladding geometric configuration to shift the dispersive effects of the resonator outside its bandwidth; that is, the frequency range of interest. Doing so can reduce the power losses due to free spectral range (FSR) mismatch caused by material dispersion in the resonator.

A portion of the signals are reflected by the optical resonator 112 and are received by detector 110. Detector 110 is configured to convert the CCW optical signal to an electrical signal based on the power of the signal, and provides the electrical signal to a Pound-Drever-Hall circuit 130. PDH circuit 130 is configured to generate one or more control signals to the laser source 102. Specifically, the PDH circuit 130 is configured to generate an error signal that locks the output of the laser source 102 to the resonance frequency of the optical resonator 112. The carrier frequency signal undergoes PDH phase modulation from the phase modulator 104. When the gyroscope undergoes rotation, the resonance frequencies of the optical resonator 112 will change. To compensate for the change in resonance, the PDH circuit 130, via the error signal, controls the frequency of the laser source 102 so that the laser source 102 frequency follows the resonance frequency change of the optical resonator 112. For example, as shown in FIG. 2B, as a result of the error signal generated by PDH circuit 130, one of the teeth 210 (the carrier) is locked to the frequency corresponding to one of the CCW signal peaks 204. If the CCW resonance frequency changes, the PDH error signal from PDH circuit 130 detects the change in resonance frequency and forces the carrier frequency of laser source 102 to be adjusted accordingly to maintain the frequency lock.

After propagating in the optical resonator 112, the optical signals are coupled out of the resonator (e.g., through an optical coupler) and are provided to either a detector 114 or a phase modulator 116. The phase modulator 116 is configured to modulate the phase of the optical signals and generate phase-modulated optical signals. The type of phase modulation can be controlled by a function generator 120. For example, the phase modulator 116 can apply a sinusoidal modulation signal to the received optical signals and generate phase-modulated optical signals having a phase shift as a function of the sinusoidal modulation signal to improve the signal-to-noise ratio through the second pass in the optical resonator 112. Other types of modulation signals can be used.

The optical signals become reflected at reflecting element 117 and begin propagating in the opposite direction toward the optical resonator 112. While reflecting element 117 is shown in FIG. 1 as a mirror, in some embodiments, the reflecting element can be a Bragg grating configured to reflect a broad spectrum. A large portion of the phase-modulated optical signals is coupled back into the optical resonator 112 (which can be nearly 100%), but a small portion may not enter the resonator and instead propagate to anti reflection end 115. Anti reflection end 115 is configured to prevent back reflection of the phase-modulated optical signals, which can cause optical interference errors with signals entering/exiting the resonator if allowed to reflect back into the optical gyroscope 100.

Upon reaching the optical resonator 112, the phase-modulated optical signals are coupled into the resonator and propagate in the resonator in a second direction opposite to the first direction. In the example shown in FIG. 1, the phase-modulated optical signals propagate in the clockwise (CW) direction in the optical resonator 112. The resonance frequency of the modes of the optical resonator 112 in the CW direction may be shifted from that of the CCW modes due to the rotation (see FIGS. 2A-2B).

To perform rotation rate processing, the phase-modulated optical signals are coupled out of the optical resonator 112 and detected by a detector 118. Detector 118 is configured to convert the phase-modulated optical signals to an electrical format based on the intensity of the signals incident on the detector, and provides the phase-modulated signals to a mixer 119. Additionally, function generator 120 is configured to provide a demodulation signal to mixer 119. Mixer 119 is configured to demodulate the phase-modulated signal from detector 118 based on the demodulation signal provided by function generator 120. The demodulated signal is then provided to processor(s) 122 for determining the rotation rate. When the optical gyroscope 100 experiences rotation, the resonance frequencies of the optical resonator 112 are shifted to different frequencies compared to the resonance frequencies when the gyroscope does not experience rotation. Hence, the intensity of the de-modulated signals correspond to the Sagnac frequency shift between CW and CCW directions. Specifically, during rotation there will be an intensity change due to the frequency shift between the optical signal propagating in the first direction through resonator 112 and the phase-modulated optical signal propagating back through the resonator 112 in the second direction. Processor 122 is configured to determine a frequency shift between the CW and CCW signals as a function of the intensity change from the output provided from mixer 119, and hence the rotation rate.

While a portion of the CCW optical signal is provided to phase modulator 116 for modulation and eventual propagation back into the optical resonator 112, another portion of the signal is detected at detector 114. The detector 114 is coupled to a control servo 150 and is configured to generate an electrical signal proportional to the intensity of the optical signal incident upon the detector. Control servo 150 comprises control and processing circuitry and is configured for feedback control of the repetition rate $F_{rep}$ of the optical frequency comb generated by electro-optic modulator 106. The repetition rate represents the difference between consecutive resonance frequency peaks (the "teeth") of the optical frequency comb, and generally are equally spaced in the frequency domain. As the repetition rate changes, control servo 150 controls the modulation applied by electro-optic modulator 106, for example, by sending control signals that configure the modulator 106 to adjust the modulation frequency applied to the laser signal from laser source 102. In doing so, the electro-optic modulator 106 can adjust the teeth of the optical frequency comb.

Figure 2A:
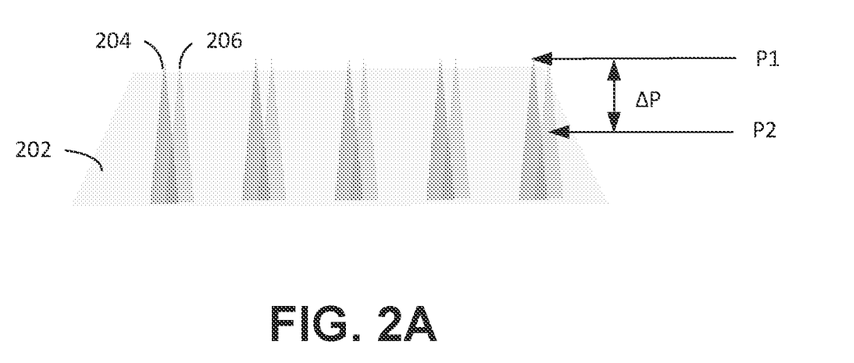
FIGS. 2A-2B depict illustrations of resonance peak shifts from optical signals generated with a broadband source and an optical frequency comb, respectively, as described in one or more embodiments.
Figure 2B:
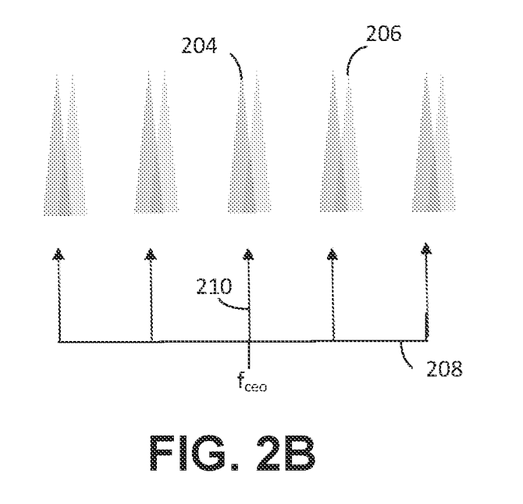

FIGS. 2A-2B depict illustrations of resonance peak shifts between CW and CCW directions due to rotation and their alignment with the optical frequency comb. FIG. 2A depicts the Sagnac frequency shift between CW and CCW directions due to rotation, and FIG. 2B depicts alignment of an optical frequency comb to the resonance frequency modes of the optical resonator. The vertical axis in FIGS. 2A-2B represents the intensity output of signals in the optical gyroscope as a function of the frequency of the signals (horizontal axis). FIGS. 2A-2B are shown for pedagogical explanation and are not necessarily drawn to scale.

Referring to FIG. 2A, the broadband laser signals 202 from the laser source 102 have a broad frequency range in comparison to output signals from a narrow linewidth laser. The broad frequency range of the broadband laser signals 202, or its spectrum, may encompass many resonance frequency modes of the optical resonator 112. Additionally, resonance peaks 204 and 206 correspond to the signals counterpropagating in the optical resonator 112. For example, in the configuration shown in FIG. 1, the signal peak 204 represents the transmission peak of a CCW optical signal frequency component first propagating in the optical resonator 112, while the signal peak 206 represents the transmission peak of a CW optical signal frequency component (the reflected optical signal) subsequently propagating in the optical resonator 112. As in FIG. 1, light passes in the CCW direction first, then gets reflected and launched back into resonator 112 in the CW direction. Due to the frequency shift during rotation, the transmitted intensity of the CW signal will be less than that of the CCW signal. Instead, the difference in intensity can be represented as shown in FIG. 2A, in which the intensity of the CCW signal is at a level P1 and the power of the CW signal is at a level P2, with the difference in intensity given by $\Delta P=P1-P2$.

As previously described, the optical resonator 112 reflects lights at frequencies outside the resonance frequency of the resonator modes, enabling only the frequency components corresponding to the resonance frequencies of the resonator to resonate. Each set of signal peaks corresponds to a distinct resonance mode of the optical resonator 112. When the gyroscope undergoes rotation, the resonance modes between the CW and CCW directions will shift in frequency relative to each other, resulting in two distinct signal peaks 204 and 206 for a given set shown in FIG. 2A. Although not shown in FIG. 2A, due to this frequency shift, the intensity of the returning phase-modulated optical signal (e.g., the CW signal) decreases because the frequency components of the CW signal are no longer at resonance center with respect to the CW resonances. Ultimately, utilizing a broadband spectrum 202 in the optical resonator 112 results in a large portion of the input optical power lost via destructive interference even before the CW optical signal returns in the resonator 112, thereby yielding poor optical efficiency. Additionally, the loss of power can impact the accuracy of rotation rate measurements determined by the optical gyroscope 100 due to the shot noise limit. Thus, while a broadband source can provide an advantage in RFOG rate sensing, it introduces the disadvantage of potential power losses in the resonator and hence alone may not be suitable for intensity change detection.

Now referring to FIG. 2B, the disadvantages of using broadband signals in resonator gyroscope operation can be compensated in the present disclosure while maintaining its advantages. Optical gyroscope 100 is configured to lock the output of the light source to the resonance frequency modes of the optical resonator 112, even when the optical gyroscope experiences rotation about its sense axis. Instead of providing broadband signals directly through the optical resonator 112, the EO modulator (106) is used to generate an optical frequency comb 208 that is provided to the optical resonator 112. As shown in FIG. 2B, each tooth 210 of the optical frequency comb 208 is locked to a resonance frequency mode of the optical resonator 112. For example, in one embodiment, each tooth 210 is locked to the center frequency of the resonance peak 204, corresponding to the CCW signals in the optical resonator 112. This reduces the power loss associated with light loss due to destructive interference of the CCW signals so that the intensity difference between the CCW and CW directions can be readily detected and improves the optical power efficiency of the gyroscope. Also, the angle random walk (ARW) of the optical gyroscope can be reduced by a factor the square root of N, where N is the number of resonance peaks utilized.

Additionally, the optical frequency comb 208 is controlled by the control servo 150 to maintain locking to the optical resonator 112. For example, during operation the frequency difference between two successive CCW peaks may change and the peaks 204 may grow further apart. To compensate for the drift in frequency spacing, control servo 150 adjusts the repetition rate (the frequency spacing between two successive teeth 210) of the optical frequency comb 208 based on the intensity of the optical signal (e.g., the CCW signal) exiting the optical resonator 112 incident upon the detector 114. In response to the change in intensity, control servo 150 is configured to adjust the repetition rate of the optical frequency comb 208 such that the OFC teeth remain locked to the signal peaks 204 of the CCW signal. In an example, when the frequency spacing between the signal peaks 204 increases so that each signal peak 204 is spaced farther apart, control servo 150 configures the electro-optic modulator 106 to decrease the repetition rate (i.e. increase the frequency spacing of the teeth 210) to match the corresponding frequency spacing between the peaks 204. Similarly, when the frequency spacing between the signal peaks 204 decreases so that each signal peak 204 is spaced closer together, control servo 150 configures the electro-optic modulator 106 to increase the repetition rate (i.e. decrease the frequency spacing of the teeth 210). To maintain the lock to the carrier frequency $F_{carrier}$, the electro-optic modulator 106 locks a tooth 210 of the optical frequency comb 208 based on the error signal generated by PDH circuit 130. In this way, the optical frequency comb 208 can be locked to the first pass resonance modes (e.g., CCW resonance peaks) of the optical resonator 112 and maintain locking even during rotation.

Figure 3:
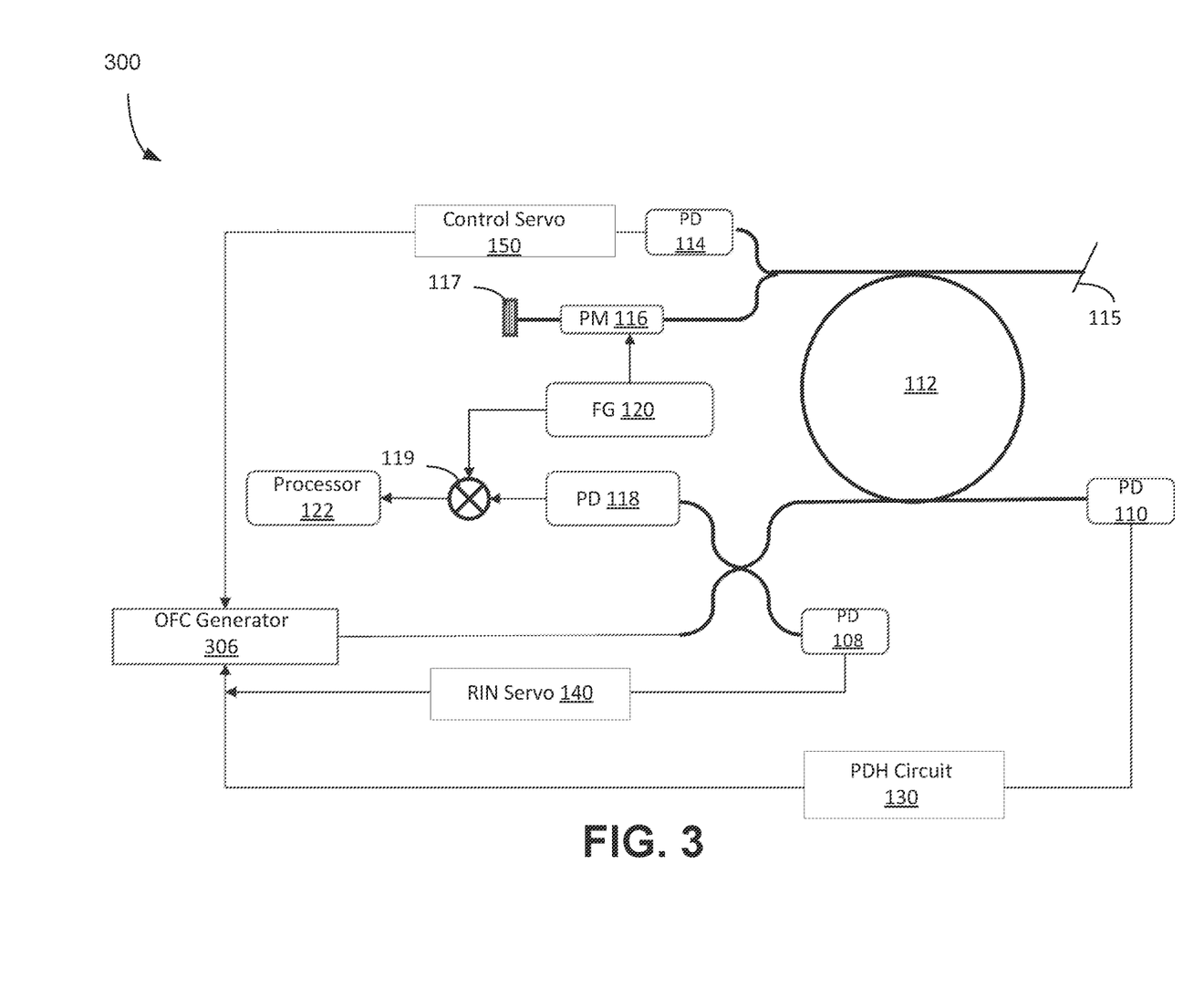
FIG. 3 depicts a block diagram of an exemplary optical gyroscope, as described in one or more embodiments.

FIG. 3 depicts a block diagram of an exemplary optical gyroscope 300. The optical gyroscope 300 depicted in FIG. 3 is an alternative embodiment of the optical gyroscope 100 depicted in FIG. 1, and generally functions similarly except as subsequently described. Specifically, optical gyroscope 300 includes an optical frequency comb generator 306 coupled to the control servo 150 and to the optical resonator 112. The optical frequency comb generator 306 is configured to generate an optical frequency comb 208 similarly as described with respect to FIGS. 1-2. In some embodiments, the optical frequency comb generator is integrated in a single unit of the optical gyroscope 300. For example, the optical frequency comb generator 306 can be a Kerr comb generator. The optical frequency comb generator 306 can also include a laser source used as a pumping source to generate the optical frequency comb. The control servo 150 adjusts the repetition rate of the optical frequency comb generated by the optical frequency comb generator 306 based on the intensity of the signal detected at detector 114. PDH circuit 130 adjusts the carrier-envelope frequency ($f_{ceo}$) of the comb to lock the teeth of optical frequency comb generator 306 to resonance peaks of optical resonator 112. Additionally, RIN servo 140 is configured to adjust the intensity of the optical frequency comb generated by the optical frequency comb generator 306 based on the intensity of the signal detected at detector 108.

Figure 4:
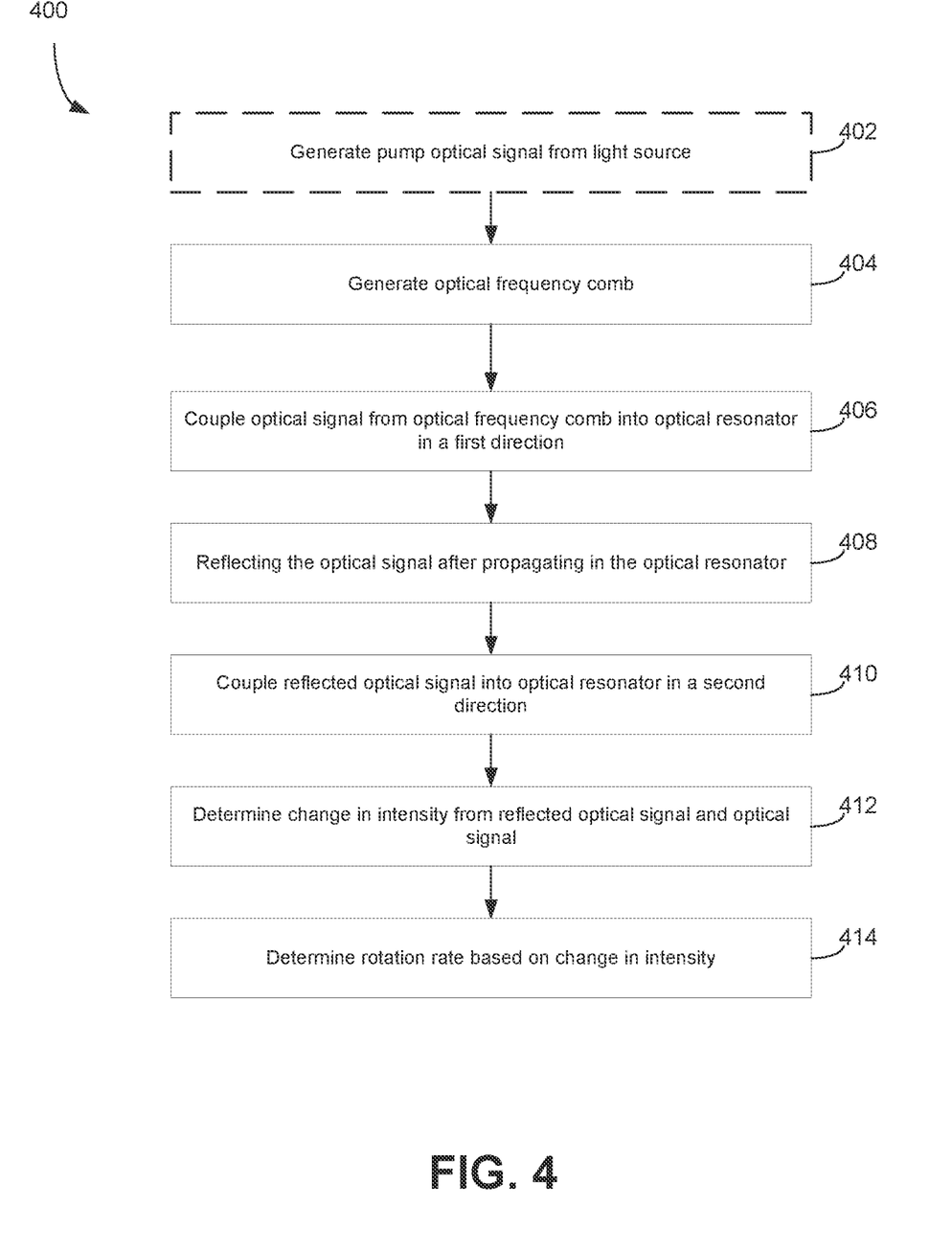
FIG. 4 depicts a flow diagram of an exemplary method for operating an optical gyroscope, as described in one or more embodiments.

FIG. 4 depicts a flow diagram of an exemplary method for operating an optical gyroscope. Method 400 may be implemented via the techniques described with respect to FIGS. 1-3 but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 400 optionally includes generating a pump optical signal from a light source at block 402. For example, the pump optical signal can be generated by a single frequency output from a laser source 102. At block 404, method 400 proceeds by generating an optical frequency comb, e.g., from the laser light from laser source 102. The optical frequency comb can be generated by an electro-optic modulator as depicted in FIG. 1 or can be generated by a specially designed optical frequency comb generator as depicted in FIG. 3. Thus, block 402 is optional because in some embodiments an optical frequency comb is generated without using a pumping source such as laser source 102. Each tooth of the optical frequency comb is set to the resonance frequency modes of the optical resonator 112 in the first direction (e.g., the CCW direction) so that the initial optical signals propagating into the optical resonator experience less power loss.

Proceeding to block 406, method 400 couples the optical signal from the optical frequency comb into the optical resonator in a first direction. In the examples shown in FIGS. 1 and 3, the first direction is the CCW direction, but in other examples the first direction can be the CW direction. The function of block 406 can be performed by a first optical coupler that couples the optical signals into the optical resonator 112. Method 400 proceeds to block 408 and reflects the optical signal after propagating in the optical resonator. This function can be performed by a reflecting element such as a mirror or Bragg grating. In some embodiments, a phase modulator coupled to the reflecting element generates a phase-modulated optical signal after exiting the optical resonator. For example, in FIG. 1, the CCW optical signal exits the optical resonator 112 and is phase-modulated by phase modulator 116 to reduce the signal-to-noise ratio.

At block 410, method 400 proceeds by coupling the reflecting optical signal into the optical resonator in a second direction. In some embodiments, the second direction is the CW direction opposite to the CCW direction in block 406. The reflected signal is then coupled out of the optical resonator after propagating one or more times in the second direction and received by one or more processors. Then, at block 412 method 400 determines a change in intensity from the reflected optical signal after propagating in the optical resonator in the second direction. The change in intensity is due to a loss in power between the optical signal and the reflected optical signal attributable to the shift of the resonance frequencies of the optical resonator. Method 400 then determines a rotation rate based on the change in intensity at block 414. For example, a large change in intensity corresponds to a high rotation rate experienced by the optical gyroscope.

Figure 5A:
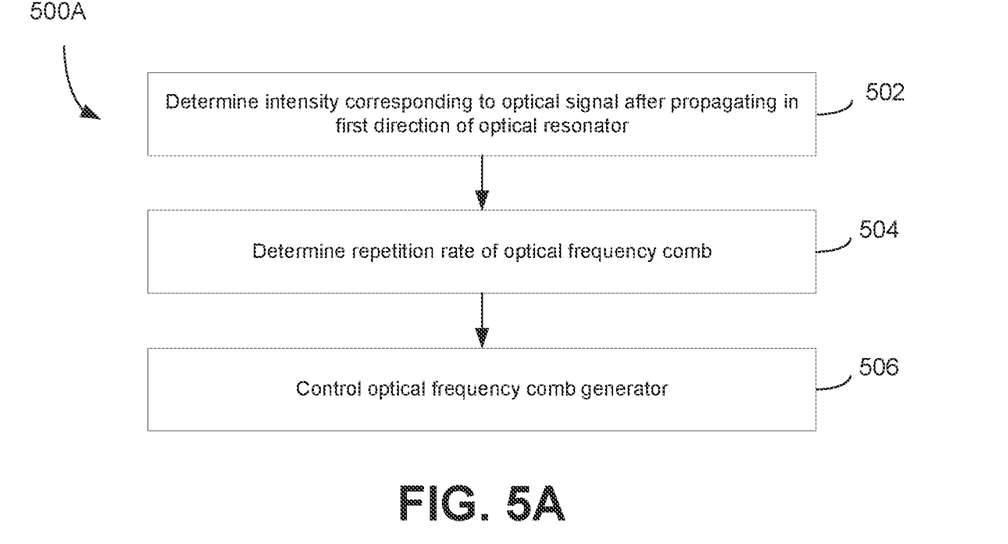
FIGS. 5A-5B depict flow diagrams of exemplary methods for controlling an optical frequency comb generator, as described in one or more embodiments.
Figure 5B:
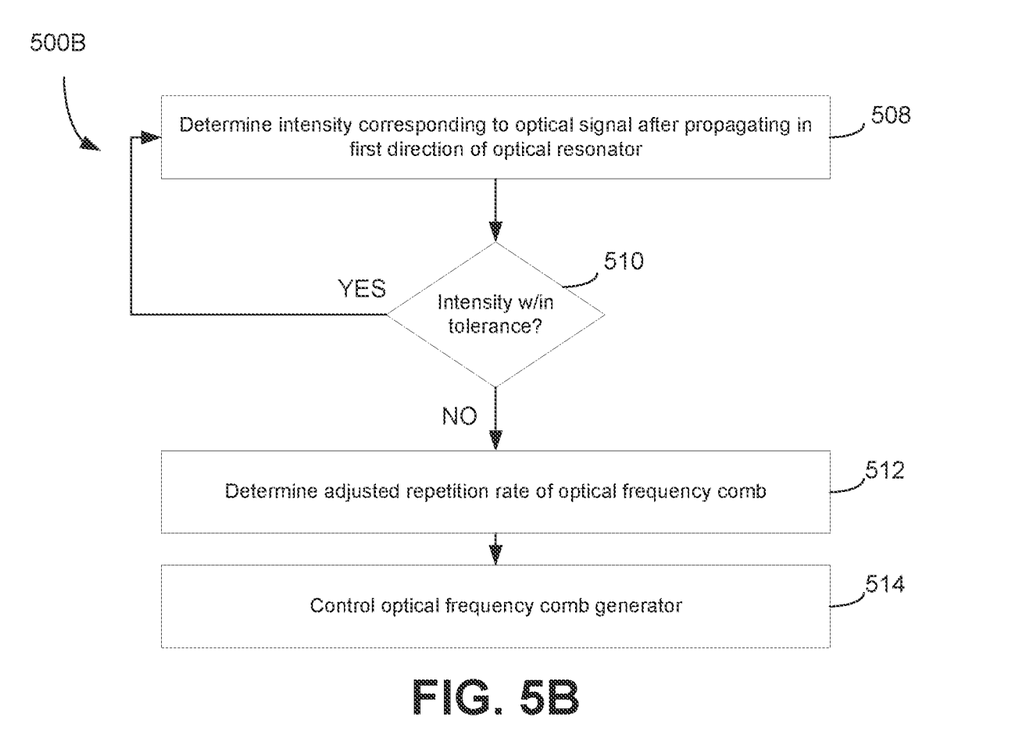

FIGS. 5A-5B depict flow diagrams of methods 500A-500B for controlling an optical frequency comb generator in an optical gyroscope. The functions performed in methods 500A-500B can be combined with respect to each other, and may be combined with the functions of method 400 in conjunction with the description of FIGS. 1-3. Methods 500A-500B can be implemented via the control servo 150 of FIGS. 1 and 3.

Referring to method 500A, which includes determining an intensity corresponding to an optical signal in the optical gyroscope at block 502. The optical signal propagates in an optical resonator in a first direction and is coupled out of the resonator and received by the control servo 150. In the embodiment of FIG. 1, the optical signal propagates in the CCW direction, converted to an electrical signal by PD 114, and provided to the control servo 150. At block 504, method 500A proceeds by determining a repetition rate of the optical frequency comb generated by the optical frequency comb generator. The repetition rate is determined based on the intensity of the optical signal, which may change during gyroscope operation as the resonance frequency spacing of the optical resonator changes. In some embodiments, method 500A determines the repetition rate based on the free spectral range between two adjacent resonance frequencies of the optical resonator. The free spectral range is determined from the optical signal propagating in the first pass through the optical resonator, which in the embodiment shown in FIG. 1 is the CCW direction.

Method 500A then proceeds to block 506 and controls the optical frequency comb generator that generates the optical frequency comb. For example, method 500A can send at least one control signal to the optical frequency comb generator that modulates the optical frequency comb based on the repetition rate. Doing so enables each tooth of the optical frequency comb to be locked to a respective one of a plurality of resonance frequencies of the optical resonator.

Now referring to method 500B, which depicts one embodiment of modulating the optical frequency comb generator as part of a control feedback loop. Method 500B includes determining an intensity corresponding to the optical signal after propagating through the optical resonator in a first direction. At block 510, method 500B determines whether the intensity corresponding to the optical signal is within a tolerance level, such as a minimum allowable threshold intensity. If so, then this signifies that the teeth of the optical frequency comb are sufficiently locked to the resonance frequencies of the optical resonator. For example, if the tolerance level is implemented as a minimum allowable threshold intensity, then an intensity above the minimum threshold indicates an efficient power efficiency through the first pass of the optical resonator via mode locking of the teeth of the optical comb. In this circumstance, method 500B can revert to block 508 and receive additional intensity measurements.

If the intensity corresponding to the optical signal is not within the tolerance level at block 510, then method 500B proceeds to block 512 and determines an adjusted repetition rate of the optical frequency comb. For example, if the tolerance level is implemented as a minimum threshold, then an intensity level below the threshold indicates that the teeth of the optical frequency comb are not sufficiently locked to the resonance frequencies of the optical resonator, and an adjustment to the optical frequency comb needs to be made. Hence at block 512 an adjusted repetition rate is determined based on the intensity corresponding to the optical signal, similar to block 504. Next, method 500B controls the optical frequency comb generator with the adjusted repetition rate at block 514, similarly as described for method 500A.

The methods and techniques described herein may be implemented at least in part in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as erasable programmable read-only memory (EPROM), electrically erasable programmable read-only memory (EEPROM), and flash memory devices; magnetic disks such as internal hard disks and removable disks; and magneto-optical disks. Any of the foregoing may be supplemented by, or incorporated in, specially-designed application specific integrated circuits (ASICs).

EXAMPLE EMBODIMENTS

Example 1 includes an optical gyroscope, comprising: an optical resonator; an optical frequency comb generator coupled to the optical resonator and configured to generate an optical frequency comb, wherein the optical frequency comb is locked to at least one of a plurality of resonance frequencies of the optical resonator; wherein the optical resonator is configured to receive an optical signal from the optical frequency comb, wherein the optical signal propagates in the optical resonator in a first direction; a reflecting element coupled to the optical resonator, wherein the reflecting element is configured to reflect the optical signal after propagating in the first direction, wherein the optical resonator is configured to receive the reflected optical signal, wherein the reflected optical signal propagates in the optical resonator in a second direction opposite to the first direction;

and at least one processor coupled to the optical resonator, wherein the at least one processor is configured to determine an intensity corresponding to the reflected optical signal after propagating in the second direction, wherein the at least one processor is configured to determine a rotation rate based on the intensity corresponding to the reflected optical signal.

Example 2 includes the optical gyroscope of Example 1, wherein the optical frequency comb comprises a plurality of frequency peaks, wherein each frequency peak overlaps with a respective resonance frequency of the optical resonator corresponding to propagation of the optical signal in the first direction.

Example 3 includes the optical gyroscope of any of Examples 1-2, comprising a control servo coupled to the optical resonator, wherein the control servo is configured to: receive the optical signal after propagating in the first direction, determine an intensity corresponding to the optical signal, and configure the optical frequency comb generator based on the intensity corresponding to the optical signal, wherein the optical frequency comb generator is configured to generate a modulated optical frequency comb in response to at least one control signal from the control servo.

Example 4 includes the optical gyroscope of Example 3, wherein the optical resonator is configured for minimal frequency dispersion in a frequency range of the optical frequency comb.

Example 5 includes the optical gyroscope of any of Examples 1-4, comprising a laser source coupled to the optical frequency comb generator, wherein the laser source is configured to generate a pump signal, wherein the optical frequency comb generator is configured to generate the optical frequency comb from the pump signal.

Example 6 includes the optical gyroscope of any of Examples 1-5, wherein the optical frequency comb generator includes an electro-optic modulator or a Kerr optical comb generator.

Example 7 includes the optical gyroscope of any of Examples 1-6, comprising a Pound-Drever-Hall circuit, wherein the Pound-Drever-Hall circuit is configured to receive the optical signal from the optical resonator and to generate an error signal based on the optical signal, wherein the error signal represents a carrier frequency indicative of one of the resonance frequencies of the optical resonator, wherein the error signal causes the optical frequency comb generator to lock a frequency peak of the optical frequency comb to the carrier frequency.

Example 8 includes the optical gyroscope of any of Examples 1-7, comprising a relative intensity noise (RIN) servo coupled to the optical frequency comb generator, wherein the RIN servo is configured to receive the optical signal from the optical frequency comb generator and to modulate an intensity of the optical frequency comb based on an intensity of the optical signal.

Example 9 includes the optical gyroscope of any of Examples 1-8, comprising a phase modulator coupled to the optical resonator and the reflecting element, wherein the phase modulator is configured to generate phase-modulated optical signals from the reflected optical signals based on a phase modulation signal.

Example 10 includes a method for operating an optical gyroscope, the method comprising: generating, from an optical frequency comb generator, an optical frequency comb, wherein the optical frequency comb is locked to at least one of a plurality of resonance frequencies of an optical resonator of the optical gyroscope; coupling an optical signal from the optical frequency comb into the optical resonator, wherein the optical signal propagates in the optical resonator in a first direction; reflecting the optical signal after propagating in the optical resonator in the first direction; coupling the reflected optical signal into the optical resonator, wherein the reflected optical signal propagates in the optical resonator in a second direction opposite to the first direction; determining a change in intensity from the optical signal and the reflected optical signal; and determining a rotation rate based on the change in intensity.

Example 11 includes the method of Example 10, wherein the optical frequency comb comprises a plurality of frequency peaks, wherein each frequency peak overlaps with a respective resonance frequency of the optical resonator corresponding to propagation of the optical signal in the first direction.

Example 12 includes the method of any of Examples 10-11, comprising: receiving the optical signal after propagating through in optical resonator in the first direction, determining an intensity corresponding to the optical signal, and configuring the optical frequency comb generator based on the intensity corresponding to the optical signal, wherein the optical frequency comb generator is configured to generate a modulated optical frequency comb in response to at least one control signal.

Example 13 includes the method of Example 12, comprising controlling a repetition rate of the optical frequency comb based on the intensity corresponding to the optical signal.

Example 14 includes the method of Example 13, comprising: determining a free spectral range based on the intensity corresponding to the optical signal; and setting the repetition rate of the optical frequency comb to the free spectral range.

Example 15 includes the method of any of Examples 10-14, comprising: generating a Pound-Drever-Hall (PDH) error signal based on the optical signal, wherein the error signal represents a carrier frequency indicative of one of the resonance frequencies of the optical resonator; and locking a tooth of the optical frequency comb to the carrier frequency.

Example 16 includes the method of any of Examples 10-15, comprising modulating an intensity of the optical frequency comb based on an intensity of the optical signal received from the optical frequency comb generator.

Example 17 includes a program product comprising a non-transitory processor-readable medium on which program instructions configured to be executed by at least one processor are embodied, wherein by executing the program instructions, the at least one processor is configured to: receive a signal corresponding to an optical signal after propagating in an optical resonator of an optical gyroscope in a first direction; determine an intensity corresponding to the signal; determine a repetition rate of an optical frequency comb based on the intensity corresponding to the signal; and send at least one control signal to an optical frequency comb generator, wherein the at least one control signal is configured to modulate an optical frequency comb generated by the optical frequency comb generator with the repetition rate.

Example 18 includes the program product of Example 17, wherein the at least one processor is configured to: determine whether the intensity corresponding to the signal is within a tolerance level; and modulate the optical frequency comb generator when the intensity is below the tolerance level.

Example 19 includes the program product of any of Examples 17-18, wherein the repetition rate corresponds to a frequency spacing between two adjacent resonance frequencies of the optical resonator, wherein the at least one processor is configured to set each frequency peak of the optical frequency comb to a respective one of a plurality of resonance frequencies.

Example 20 includes the program product of Example 19, wherein the plurality of resonance frequencies corresponds to an optical signal from the optical frequency comb generator propagating in a first pass through the optical resonator.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An optical gyroscope, comprising:
    an optical resonator;
    an optical frequency comb generator coupled to the optical resonator and configured to generate an optical frequency comb, wherein the optical frequency comb is locked to at least one of a plurality of resonance frequencies of the optical resonator;
    wherein the optical resonator is configured to receive an optical signal from the optical frequency comb, wherein the optical signal propagates in the optical resonator in a first direction;
    a reflecting element coupled to the optical resonator, wherein the reflecting element is configured to reflect the optical signal after propagating in the first direction,
    wherein the optical resonator is configured to receive the reflected optical signal, wherein the reflected optical signal propagates in the optical resonator in a second direction opposite to the first direction; and
    at least one processor coupled to the optical resonator, wherein the at least one processor is configured to determine an intensity corresponding to the reflected optical signal after propagating in the second direction, wherein the at least one processor is configured to determine a rotation rate based on the intensity corresponding to the reflected optical signal.

2. The optical gyroscope of claim 1, wherein the optical frequency comb comprises a plurality of frequency peaks, wherein each frequency peak overlaps with a respective resonance frequency of the optical resonator corresponding to propagation of the optical signal in the first direction.

3. The optical gyroscope of claim 1, comprising a control servo coupled to the optical resonator, wherein the control servo is configured to:
    receive the optical signal after propagating in the first direction,
    determine an intensity corresponding to the optical signal, and
    configure the optical frequency comb generator based on the intensity corresponding to the optical signal,
    wherein the optical frequency comb generator is configured to generate a modulated optical frequency comb in response to at least one control signal from the control servo.

4. The optical gyroscope of claim 3, wherein the optical resonator is configured for minimal frequency dispersion in a frequency range of the optical frequency comb.

5. The optical gyroscope of claim 1, comprising a laser source coupled to the optical frequency comb generator, wherein the laser source is configured to generate a pump signal, wherein the optical frequency comb generator is configured to generate the optical frequency comb from the pump signal.

6. The optical gyroscope of claim 1, wherein the optical frequency comb generator includes an electro-optic modulator or a Kerr optical comb generator.

7. The optical gyroscope of claim 1, comprising a Pound-Drever-Hall circuit, wherein the Pound-Drever-Hall circuit is configured to receive the optical signal from the optical resonator and to generate an error signal based on the optical signal, wherein the error signal represents a carrier frequency indicative of one of the resonance frequencies of the optical resonator, wherein the error signal causes the optical frequency comb generator to lock a frequency peak of the optical frequency comb to the carrier frequency.

8. The optical gyroscope of claim 1, comprising a relative intensity noise (RIN) servo coupled to the optical frequency comb generator, wherein the RIN servo is configured to receive the optical signal from the optical frequency comb generator and to modulate an intensity of the optical frequency comb based on an intensity of the optical signal.

9. The optical gyroscope of claim 1, comprising a phase modulator coupled to the optical resonator and the reflecting element, wherein the phase modulator is configured to generate phase-modulated optical signals from the reflected optical signals based on a phase modulation signal.

10. A method for operating an optical gyroscope, the method comprising:
    generating, from an optical frequency comb generator, an optical frequency comb, wherein the optical frequency comb is locked to at least one of a plurality of resonance frequencies of an optical resonator of the optical gyroscope;
    coupling an optical signal from the optical frequency comb into the optical resonator, wherein the optical signal propagates in the optical resonator in a first direction;
    reflecting the optical signal after propagating in the optical resonator in the first direction;
    coupling the reflected optical signal into the optical resonator, wherein the reflected optical signal propagates in the optical resonator in a second direction opposite to the first direction;
    determining a change in intensity from the optical signal and the reflected optical signal; and
    determining a rotation rate based on the change in intensity.

11. The method of claim 10, wherein the optical frequency comb comprises a plurality of frequency peaks, wherein each frequency peak overlaps with a respective resonance frequency of the optical resonator corresponding to propagation of the optical signal in the first direction.

12. The method of claim 10, comprising:
    receiving the optical signal after propagating through in optical resonator in the first direction,
    determining an intensity corresponding to the optical signal, and
    configuring the optical frequency comb generator based on the intensity corresponding to the optical signal,
    wherein the optical frequency comb generator is configured to generate a modulated optical frequency comb in response to at least one control signal.

13. The method of claim 12, comprising controlling a repetition rate of the optical frequency comb based on the intensity corresponding to the optical signal.

14. The method of claim 13, comprising:
determining a free spectral range based on the intensity corresponding to the optical signal; and
setting the repetition rate of the optical frequency comb to the free spectral range.

15. The method of claim 10, comprising:
generating a Pound-Drever-Hall (PDH) error signal based on the optical signal, wherein the error signal represents a carrier frequency indicative of one of the resonance frequencies of the optical resonator; and
locking a tooth of the optical frequency comb to the carrier frequency.

16. The method of claim 10, comprising modulating an intensity of the optical frequency comb based on an intensity of the optical signal received from the optical frequency comb generator.

* * * * *